Feb. 5, 1963 T. J. BARRY ETAL 3,076,926
MEANS FOR CONTROLLING THE TEMPERATURE, PRESSURE, OR RATE
OF FLOW OF A FLUID, OR FOR OTHER ANALOGOUS PURPOSES
Filed Nov. 7, 1960

Inventors
T. J. Barry
W. Burke
By (signature)
Attys.

United States Patent Office 3,076,926
Patented Feb. 5, 1963

3,076,926
MEANS FOR CONTROLLING THE TEMPERATURE, PRESSURE, OR RATE OF FLOW OF A FLUID, OR FOR OTHER ANALOGOUS PURPOSES
Thomas J. Barry and Wilfred Burke, Stevenage, England, assignors to Ether Limited, Erdington, England
Filed Nov. 7, 1960, Ser. No. 67,816
3 Claims. (Cl. 323—64)

This invention relates to means for controlling the temperature, pressure, or rate of flow of a fluid, or for other analogous purposes where a variable quantity is indicated and/or recorded by a measuring instrument.

The object of the invention is to provide improved means for co-ordinating the actions of a control means and the indicating instrument.

The invention comprises the combination with an indicating and/or recording instrument, of an adjustable control pointer which is movable relatively to the scale of the said instrument, a metal band adapted to provide a gap between a pair of adjacent end portions of the band, which portions are interconnected by a coupling made from electrical insulating material carrying the control pointer, and contacts carried by, or responsive to movement of, the finger of the indicating instrument and forming part of a relay control circuit which includes the said band and a fixed conductor associated with the band.

Alternatively, the invention comprises an arrangement as defined in the preceding paragraph, in which the ends of the metal band associated with the adjustable control pointer are interconnected by a potentiometer resistance with which one of the indicator contacts can co-operate.

In the accompanying drawings—

Figure 1:
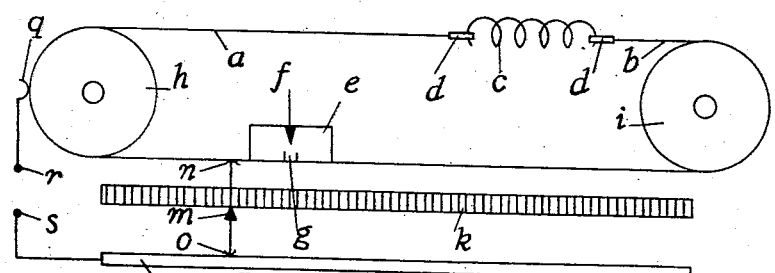
FIGURE 1 illustrates diagrammatically a typical embodiment of the invention.

Referring to the example illustrated by FIGURE 1, the apparatus there shown includes a virtually endless band formed from a pair of flexible metal strips $a$, $b$. One pair of ends are interconnected by a tension spring $c$ which is attached to the said ends by pieces $d$ made from electrical insulating material. The other pair of ends are anchored to a piece $e$ of electrical insulating material, and are separated by a gap $g$. On the piece $e$ is provided a control pointer $f$ coincident with the adjacent end of the strip $a$.

The strips $a$, $b$ are respectively carried by a pair of pulleys $h$, $i$, the pulley $i$ being rotatable by hand for bringing the control pointer $f$ to any desired position relatively to the scale $k$ of an indicating instrument. The movable pointer $m$ of the indicating instrument has secured to it, or has otherwise associated with it, a pair of switch contacts $n$, $o$. The contact $n$ co-operates with one side of the strips $a$, $b$, and the contact $o$ co-operates with a fixed metal bar $p$ arranged parallel with the scale $k$.

A resilient contact $q$ bears against the portion of the strip $a$ on the pulley $h$ and is connected to a terminal $r$ of a relay circuit. The other terminal $s$ of this circuit is connected to the bar $p$.

Assuming that the apparatus above described is required for use in conjunction with means for controlling the temperature of a furnace, and an instrument for indicating the temperature, the mode of action is as follows: Initially the pulley $i$ is adjusted by hand to bring the control pointer $f$ to a position relatively to the scale $k$ corresponding to the temperature to be maintained. If at any instant the actual temperature is below the desired temperature, the pointer $m$ of the indicating instrument will occupy a position such as that shown in the drawing. In this condition the relay circuit will be closed, and the associated relay will cause the temperature control means to operate in the direction for increasing the temperature. The indicator pointer $m$ will then move to the right until the contact $n$ reaches the gap $g$ between the strips $a$, $b$. At this instant the relay circuit will be opened. Continued rise of the temperature will then be accompanied by reverse action of the control means causing the temperature to fall, and so reclose the relay circuit. By this intermittent reversal of action of the control means the temperature will be closely maintained at the desired amount.

The invention ensures in a reliable manner that the reversal of action of the control means occurs only when the indicator pointer $m$ is in exact coincidence with the control pointer $f$. A further advantage of the invention is that the contacts of the relay control circuit are kept clean by the rubbing action which occurs between them and the parts $a$, $p$.

The invention is applicable in like manner to apparatus for controlling the pressure or rate of flow of a fluid, or other apparatus for analogous purposes.

Referring now to the example illustrated by FIGURES 2 and 3, this is essentially similar to that described with reference to FIGURE 1, but differs in that the adjacent ends of the strips $a$, $b$ associated with the control pointer $f$ are also interconnected by a potentiometer resistance $v$ with which the contact $n$ of the indicator pointer $m$ can co-operate, the arrangement being such that the amount of resistance between any given point and one end of the metal strip $a$ is proportional to the distance from the said end of the strip. In practice the distance between the ends of the strips $a$, $b$, to which the resistance is attached may be as small as 0.125 of an inch.

Figure 3:
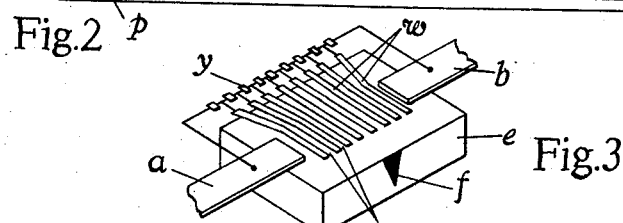
FIGURE 3 is a fragmentary view illustrating to an enlarged scale one form of resistance connected between the adjacent ends of the flexible metal band associated with the control pointer.

The resistance $v$ may be in any convenient form, but a particularly suitable arrangement consists (as shown in FIGURE 3) of a printed circuit in which lines of conducting material $w$ are separated by lines of insulating material $x$ and small resistance units $y$ connected between adjacent conducting lines.

The strips $a$, $b$ as in the example described with reference to FIGURE 1, are carried by a pair of pulleys $h$ and $i$ one of which ($i$) is rotatable by hand for bringing the control pointer $f$ to any desired position relatively to the scale $k$ of the indicating instrument. The movable finger $m$ of the indicating instrument has secured to it, or has otherwise associated with it, a pair of switch contacts. One contact $n$ co-operates with one side of the strip $a$ and the resistance $v$, and the other contact $o$ co-operates with a fixed bar $p$ arranged parallel with the scale $k$.

Also, as in the example described with reference to FIGURE 1, a resilient contact $q$ is connected to a terminal $r$ and bears against the portion of the strip $a$ on the pulley $h$ and another terminal $s$ is connected to the fixed bar $p$ arranged parallel with the scale. In addition, another resilient contact $u$ is connected to a terminal $t$ and bears against the portion of the metal strip $b$ on the pulley $i$.

The arrangement can be adapted to produce a variety of control functions in which an electrical signal proportional to the distance of the pointer of the measuring instrument from the pre-set control pointer is required.

Figure 4:
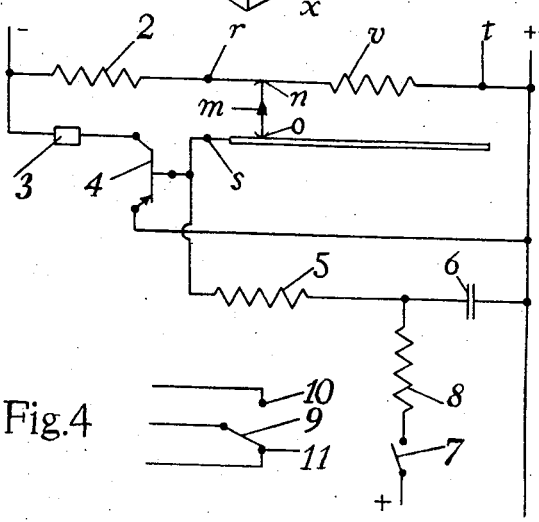
FIGURE 4 is a diagrammatic representation of a circuit arrangement embodying the control means illustrated by FIGURE 2.

An example of such an arrangement is illustrated in FIGURE 4 where $s$ again represents the terminal connected to the sliding contact $o$, and $r$ and $t$ represent the terminals which are electrically connected to the ends of the resistance element *v* through the portions *a* and *b* of the metal band. The terminal *r* is connected through a fixed resistance 2 to the negative side of a suitable direct current supply and the terminal *t* is connected to the positive side of the same direct current supply. A relay 3 is also connected across the same direct current supply through the emitter and collector of a transistor 4. The terminal *s* is connected to the base of the transistor 4 and also to a fixed resistor 5, the other end of which is connected to a condenser 6. The other side of the condenser 6 is connected to the emitter of the transistor and to the negative side of a second direct current supply which is common with the positive side with the first direct current supply. The positive side of the second supply is connected through a contact 7 of the relay 3 and a fixed resistance 8 to the condenser 6 so that when the contact 7 closes the condenser 6 is charged from the second supply. The relay 3 has other contacts such that when the device is used for control, for example, the fuel supply to a boiler or furnace, full fuel supply is obtained when the contact 9 is connected to contact 10 and a reduced supply is obtained when contact 9 is connected to contact 11.

In operation, if the measured value is below the desired control value, the finger *m* of the instrument will occupy a position such as that shown in FIGURE 4, and the terminal *s* will be at the same potential as the terminal *r*, so that a bias will be applied between the base and emitter of transistor 4 of such polarity as to increase the collector current. In this condition sufficient current will flow through the transistor to energise the relay 3 and thereby close the switch 7 and connect the switch 9 to the contact 10, thus causing increases of fuel supply which in turn will cause the indicating finger *m* to travel up the scale. Also when the switch 7 is closed a bias is applied (through resistance 8 and 5) between the base and emitter of the transistor 4 in the reverse direction, so reducing the current flowing through the transistor, whilst at the same time the condenser 6 is charged. The values of resistance 5 and 8 are so chosen that when the condenser 6 is fully charged the current flowing through the transistor and hence the relay is sufficient to hold the relay in the energised condition.

As the measured temperature further increases the contact *n* engages the resistance *v* and as it traverses over the resistance, the potential at *s* will be increased, so that the bias between the base and emitter of the transistor will be decreased to reduce the current flow through the transistor until the relay 3 becomes de-energised. The switch 9 is thereupon connected to the contact 11, thereby reducing the fuel supply. At the same time the switch 7 is opened, thereby disconnecting the current supply from the condenser 6. The condenser then discharges through the base-emitter of the transistor and through a path including terminal *s*, contacts *o* and *n*, and the portion of the resistance *v* between *n* and the terminal *t*. The bias applied between the base and collector, and between the base and emitter is then altered so that the current flowing through the transistor is increased to re-energise the relay 3 before an apperciable movement of the finger *m* can occur.

By the arrangement above described, the relay is alternately energised and de-energised on a time cycle, the total time of which depends on the values of the condenser 6 and resistances 5 and 8, the proportion of energised to de-energised times depending on the position of the moveable point *m* relative to the control pointer *f*. In this way the measured quantity is controlled at the pre-set value without apperciable movement of the finger of the instrument.

Figure 2:
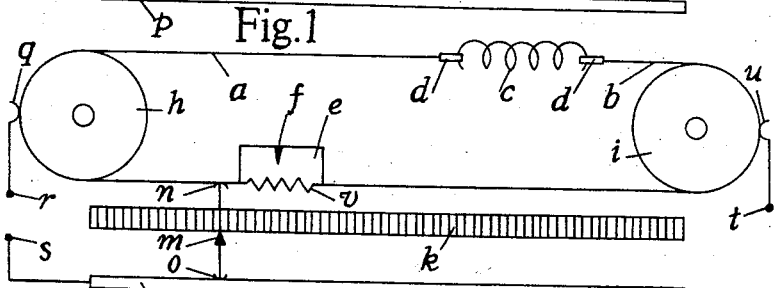
FIGURE 2 is a similar view to FIGURE 1 illustrating the alternative embodiment of the invention.

The embodiments of the invention above described and illustrated by FIGURES 1 and 2 are of a kind adapted for use in an apparatus in which a straight scale is employed. The invention may, however, be also applied in an essentially similar manner to an apparatus in which a circular scale is used. In this case, there may, for example, be provided a single pulley arranged concentrically with the circular scale. On this pulley is monuted an adjustable metal band having a gap between a pair of adjacent ends of the band, and a control pointer carried by the band.

Having thus described our invention what we claim as new and desire to secure by Letters Patent is:

1. A contact regulator comprising in combination an instrument including a fixed scale and an indicating finger, means responsive to a condition to be controlled for moving said indicating finger over said scale, a split conductive band, an electrically insulating part interconnecting adjacent ends of the band, means mounting said band and part to extend parallel to said scale, said means permitting movement of the band relative to the scale while maintaining said parallel relationship, a control pointer carried by said electrically insulating part, a fixed conductor extending parallel to said band and said scale, a pair of contact pieces secured to said indicating finger for movement therewith, said contact pieces sliding in contact with said band and said conductor respectively, and an electrical control circuit for controlling said condition, said circuit including said band, said conductor and said contact pieces, and serving to effect a control of said condition until the indicating finger and control pointer are in register.

2. A contact regulator as claimed in claim 1 including a potentiometer resistance carried by said insulating part and over which the contact piece sliding on the band moves, said potentiometer resistance forming part of the control circuit.

3. A contact regulator as claimed in claim 1 in which said means mounting said band and part to extend parallel to said scale includes a pair of spaced, rotatable pulleys around which the band passes.

References Cited in the file of this patent

UNITED STATES PATENTS 2,675,510    Belcher  ---------------- Apr. 13, 1954